Dec. 14, 1965  R. R. PARKS  3,223,433
VEHICLE SUSPENSION CONSTRUCTION
Filed March 18, 1964
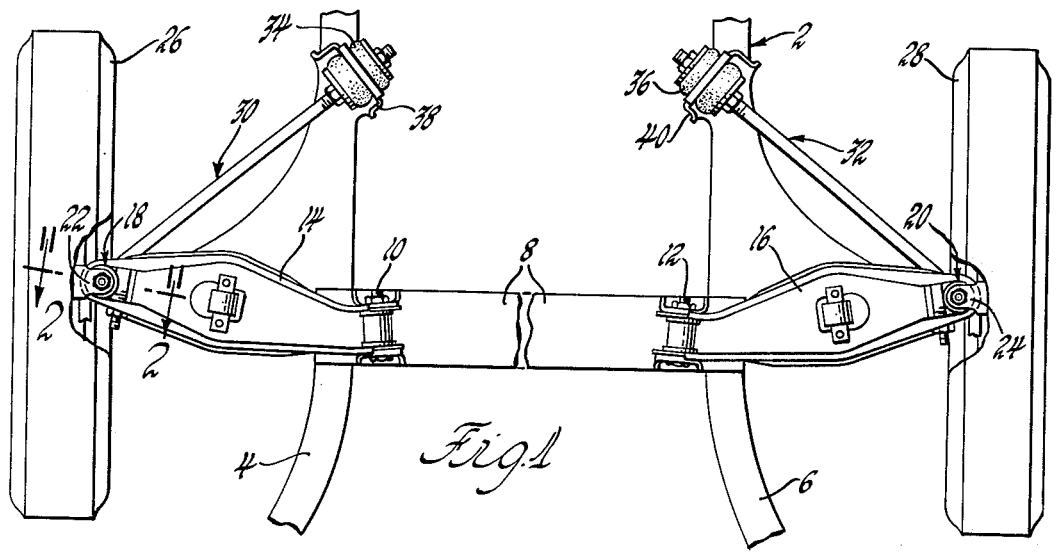
INVENTOR.
Robert R. Parks
BY
W. F. Wagner
ATTORNEY

United States Patent Office 3,223,433
Patented Dec. 14, 1965

3,223,433
VEHICLE SUSPENSION CONSTRUCTION
Robert R. Parks, Warren, Mich., assignor to General Motors Corporation, Detroit, Mich., a corporation of Delaware
Filed Mar. 18, 1964, Ser. No. 352,924
6 Claims. (Cl. 280—96.2)

This invention relates to vehicle suspension and more particularly to independent wheel suspension utilizing strut type wheel control arms.

In current independent front wheel suspension, it has become common to employ a strut type lower control assembly in which a generally transversely extending vertically swingable beam is stabilized by a diagonally extending strut. In the typical case, the inboard end of the beam is pivotally connected to the vehicle superstructure on a single relatively short elastically buffered pin joint. The strut is then rigidly attached at one end to the outer end of the beam and at the other end adjustably connected to a grommet type elastic mount secured on the vehicle superstructure in a location on or near the projected axis of the pin joint. Conventionally, the adjacent outer ends of the strut and beam are secured together by bolts, riveting or other convenient means to provide an essentially unitary V-shaped control arm. In this and other types of control arm constructions, it is also conventional practice to utilize ball joint assemblies to provide the operative connection with associated portions of the steering knuckle assembly upon which the usual vehicle wheel is rotatably mounted. Of the several types of ball joint assemblies presently utilized in commercial passenger vehicles, one of the most common utilizes a forged or cast housing having a contoured outer surface shaped to generally conform with adjacent wall surfaces on the outer end of the control arm. In assembling control arm and ball joint assemblies of this type, it has been the practice to provide a plurality of lugs or ears which are arranged with reference to the geometric center of the joint so as to provide optimum resistance to the various transient forces to which ball joints are subjected during vehicle operation. The present invention is concerned primarily with improvement and simplification in construction and assembly of strut type control arms utilizing ball joint assemblies of the general type referred to.

An object of the present invention is to provide an improved suspension control arm construction.

Another object is to provide improved and simplified means for attaching ball joint assemblies to strut type wheel control arms.

A further object is to provide an arrangement of the stated character which enables reduction in assembly time and initial fabrication cost of ball joint assemblies for control arms utilizing attached struts.

A still further object is to provide a control arm assembly comprising an interlocking beam, stru, and ball joint assembly.

These and other objects, advantages and features of the invention will become more fully apparent as reference is had to the accompanying specification and drawing wherein:

FIGURE 1 is a bottom plan view of a vehicle chassis incorporating suspension structure in accordance with the invention;

FIGURE 2 is an enlarged fragmentary side elevational view, partly in section, looking in the direction of arrows 2—2 of FIGURE 1;

FIGURE 3 is an enlarged fragmentary view looking in the direction of arrows 3—3 of FIGURE 2;

FIGURE 4 is a view similar to FIGURE 2 showing a modified form of the invention; and FIGURE 5 is a view looking in the direction of arrows 5—5 of FIGURE 4.

Referring now to the drawing and particularly FIGURE 1, there is shown the forward portion of a vehicle chassis in which the reference numeral 2 designates the frame or superstructure which includes side rails 4 and 6 and a cross member 8. Pivotally connected at their inboard ends by rubber bushed pin joints 10 and 12 are a pair of generally transversely extending vertically swingable wheel control arms 14 and 16 having ball joint assemblies 18 and 20 operatively connected at the outboard ends thereof. Assemblies 18 and 20 universally support the lower ends of vertically extending wheel knuckle elements 22 and 24 upon which are rotatably mounted wheels 26 and 28. It will be understood that the upper ends of knuckle elements 22 and 24 are connected to upper control arms, not shown, in the conventional manner. Extending diagonally between the outer end of each beam 14 and 16 and the frame side rails 4 and 6 are strut rods 30 and 32, the outer ends of which are rigidly secured to beams 14 and 16 in a manner shortly to be described, while the inner ends thereof are secured by means of opposed grommet type elastic mounts 34 and 36 to brackets 38 and 40 located in general alignment with the projected axes of pin joints 10 and 12.

In accordance with one feature of the invention, the outer ends of struts 30 and 32 cooperate with the outer ends of beams 14 and 16 and ball joint assemblies 18 and 20 in a manner providing simultaneous interlocking engagement in assembled relation. Since the construction at both sides of the vehicle is identical, the following description related to one side of the vehicle will be understood to apply to both. As seen best in FIGURES 2 and 3, the outer end of beam 14 includes spaced side walls 42 and 44 having aligned apertures 46 and 48 formed therein adapted to receive the bent end portion 50 of strut rod 30. The portion of rod 30 immediately adjacent the end portion 50 is preferably upset to form a shoulder 52, while the terminal portion 54 is threaded to receive a nut 56. Accordingly, the strut may be readily assembled or disassembled relative to beam 14 merely by installing or removing the nut 56.

According to another feature of the invention, the ball joint assembly 18 is provided with a forged housing 58 which is adapted for nesting relation in the outer end of beam 14 between walls 42 and 44. Housing 58 includes an integral upwardly extending stud 60 which projects through an aperture 62 in the top wall 64 of beam 14 and is threadably secured against vertical movement by nut 66. Forging 58 also includes an integral boss 68 shaped to provide a longitudinally extending semi-circular lip 70 which overlaps the end portion 50 of rod 30 and completely spans the space between side walls 42 and 44 in alignment with apertures 46 and 48. In consequence, the wall portion of lip 70 not only serves to reinforce the side walls 42 and 44 against collapse resulting from tightening of nut 56, but additionally cooperates with rod end portion 50 to anchor forged housing 58 against both lateral rocking or rotational movement about the axis of stud 60. As a result, a very high degree of rigidity of securement is obtained between the beam, strut, and ball joint housing, yet assembly and disassembly may be accomplished very rapidly by merely installing or removing nuts 56 and 66.

In FIGURES 4 and 5, there is shown a modification of the invention wherein the housing 58 is provided with a boss 72 having a central bore 74 extending therethrough in alignment with apertures 46 and 48 which completely surrounds rod end 50. It will, of course, be apparent that improved resistance to side loadings as well as greater structural strength may be accomplished in this manner.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a suspension structure, the combination of a control arm having a top wall formed with a vertically directed aperture and spaced side walls formed with aligned apertures horizontally displaced from said vertically directed aperture, a ball joint housing disposed between the side walls of said arm in abutting relation with said top wall, stud means projecting through said vertical aperture connecting said housing to said top wall, a strut rod associated with said arm including an end portion extending through said aligned apertures, and laterally projecting means on said housing surroundingly engaging at least a part of the end portion contained between said side walls.

2. In a suspension structure, the combination of a control arm having a top wall formed with a vertically directed aperture and spaced side walls formed with horizontally aligned apertures laterally displaced from said vertically directed aperture, a ball joint housing disposed between the side walls of said arm in abutting relation with said top wall, said housing including an integral stud projecting through said vertical aperture, a strut rod associated with said arm including an end portion extending through said aligned apertures, and laterally projecting means on said housing spanning the space between said side walls and surroundingly engaging at least a part of the end portion contained between said side walls.

3. In a suspension structure, the combination of a control arm having a top wall formed with a vertically directed aperture and spaced side walls formed with aligned apertures horizontally displaced from said vertically directed aperture, a ball joint housing disposed between the side walls of said arm in abutting relation with said top wall, said housing including an integral stud projecting through said vertical aperture, a strut rod associated with said arm including an end portion extending through said aligned apertures, and laterally projecting means on said housing aligned with said apertures and spanning the space between said side walls, said projecting means having a bore formed therein totally surrounding the end portion contained between said side walls.

4. In a suspension structure, the combination of a control arm having a top wall formed with a vertically directed aperture and spaced side walls formed with aligned apertures horizontally displaced from said vertically directed aperture, a ball joint housing disposed between said side walls of said arm in abutting relation with said top wall, said housing including a nut engaging integral stud projecting through said vertical aperture, a strut rod associated with said arm including an end portion extending through said aligned apertures, and laterally projecting means on said housing forming a semi-circular lip aligned with said apertures and spanning the space between said side walls, said lip surroundingly engaging part of the end portion contained between said side walls.

5. In a suspension structure, the combination of a control arm having a top wall formed with a vertically directed aperture and spaced side walls formed with aligned apertures horizontally displaced from said vertically directed aperture, a ball joint housing disposed between said side walls of said arm in abutting relation with said top wall, said housing including a nut engaging integral stud projecting through said vertical aperture, a strut rod associated with said arm including an end portion extending through said aligned apertures, laterally projecting means on said housing forming a semi-circular lip aligned with said apertures and spanning the space between said side walls, said lip surroundingly engaging part of the end portion contained between said side walls, and clamping means on said strut rod operative to urge said side walls into abutting relation with the oppoite ends of said projecting means.

6. The structure set forth in claim 5 wherein said clamping means comprises a shoulder formed on said rod adjacent said end portion and nut engaging threaded means on the extremity of said end portion.

References Cited by the Examiner
UNITED STATES PATENTS

| | | | |
|---|---|---|---|
| 2,596,922 | 2/1952 | Thorns | 280—96.2 |
| 3,079,137 | 2/1963 | Schilberg | 267—67 X |
| 3,103,370 | 9/1963 | Krizman | 287—90 X |
| 3,103,377 | 9/1963 | Scheublein | 287—90 |
| 3,123,348 | 3/1964 | Hildebrandt | 267—20 X |
| 3,139,275 | 6/1964 | Burkitt | 280—96.2 X |

BENJAMIN HERSH, *Primary Examiner.*